United States Patent
Rector et al.

(10) Patent No.: US 9,442,188 B2
(45) Date of Patent: Sep. 13, 2016

(54) NEGATIVE PSEUDO-RANGE PROCESSING WITH MULTI-STATIC FMCW RADARS

(71) Applicant: CODAR Ocean Sensors, Ltd, Mountain View, CA (US)

(72) Inventors: William C. Rector, San Jose, CA (US); Donald E. Barrick, Emerald Hills, CA (US); Belinda J. Lipa, Portola Valley, CA (US); Hector Aguilar, Jr., San Francisco, CA (US)

(73) Assignee: CODAR Ocean Sensors, Ltd., Mountain View, CA (US)

( * ) Notice: Subject to any disclaimer, the term of this patent is extended or adjusted under 35 U.S.C. 154(b) by 432 days.

(21) Appl. No.: 14/213,841

(22) Filed: Mar. 14, 2014

(65) Prior Publication Data
US 2016/0069992 A1  Mar. 10, 2016

(51) Int. Cl.
*G01S 7/35* (2006.01)
*G01S 13/00* (2006.01)
*G01S 13/87* (2006.01)

(52) U.S. Cl.
CPC ................ *G01S 13/003* (2013.01); *G01S 7/35* (2013.01); *G01S 13/874* (2013.01); *G01S 13/878* (2013.01)

(58) Field of Classification Search
CPC ...... G01S 7/35; G01S 13/003; G01S 13/874; G01S 13/878
USPC .................................................. 342/59, 109
See application file for complete search history.

(56) References Cited

U.S. PATENT DOCUMENTS

| 4,996,533 | A | * | 2/1991 | May | G01S 13/0218 342/108 |
|---|---|---|---|---|---|
| 5,361,072 | A | * | 11/1994 | Barrick | G01S 7/35 342/133 |
| 5,381,222 | A | * | 1/1995 | Palmer | G01S 17/95 356/4.01 |
| 5,469,168 | A | * | 11/1995 | Anderson | G01S 13/951 342/192 |
| 5,990,834 | A | * | 11/1999 | Barrick | G01S 3/74 342/195 |
| 6,462,699 | B2 | * | 10/2002 | Wurman | G01S 13/003 342/147 |
| 6,774,837 | B2 | * | 8/2004 | Barrick | G01S 7/02 342/104 |
| 6,856,276 | B2 | * | 2/2005 | Barrick | G01S 7/02 342/128 |
| 2003/0025629 | A1 | * | 2/2003 | Barrick | G01S 7/02 342/59 |
| 2003/0071751 | A1 | * | 4/2003 | Barrick | G01S 7/02 342/104 |
| 2005/0285787 | A1 | * | 12/2005 | Delaveau | G01S 13/003 342/387 |

* cited by examiner

*Primary Examiner* — Peter Bythrow
(74) *Attorney, Agent, or Firm* — Weaver Austin Villeneuve & Sampson LLP

(57) ABSTRACT

A multi-static radar system for monitoring water surface targets is provided. The multi-static radar system may include a first and second radar, a state machine, and a signal processor. The radars may be located in separate locations and synchronized using timing signals. The state machine may be configured to determine, using the timing signals, start times and end times of radio frequency signal modulations for each radar. A concept of negative pseudo-range is provided, whereby the modulation start times are configured to allow pseudo-negative time delays at as many as half of the radar receivers, thereby doubling the multi-static echo detections. The signal processor may be configured to simultaneously receive and process the echoes of the radar signals received at the radars to determine position and velocity vectors for the monitored water surface targets.

20 Claims, 5 Drawing Sheets

NEGATIVE PSEUDO-RANGE PROCESSING WITH MULTI-STATIC FMCW RADARS

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND

Low-frequency backscatter radar systems, operating in the MF, HF, VHF, and UHF bands, are widely used for mapping and monitoring water surface targets such as currents, vessels, and waves on the ocean, or water flow along rivers. Nearly 150 such HF/VHF radars presently operate along the U.S. coasts as part of the U.S. Integrated Ocean Observing System (IOOS) program of the National Oceanic and Atmospheric Administration (NOAA), and such systems output their data to public websites (hfradar.ndbc.noaa.gov). Several other countries now have such radar networks on their coasts. A total of at least 400 of these oceanographic radars are deployed and operate worldwide.

At least two backscatter radars are normally needed to map currents, because each radar measures only a scalar radial vector component, and a view from two directions is needed to construct a total 2D vector for a map. These scalar velocities are based on the Doppler principle that separates the known Bragg-wave velocity from the unknown current velocity. In the case of a vessel target, its position and radial velocity are measured by a single radar, but a view from two radars offers the advantage of increased detection robustness.

Range or distance to the target or scattering cell is obtained from the time delay between transmit and received echoes, as is the case in all radars. Oceanographic radars in operation today employ FMCW signals (frequency modulated continuous wave), and commonly assigned U.S. Pat. No. 5,361,072, filed Feb. 28, 1992, entitled "Gated FMCW DF radar and signal processing for range/doppler/angle determination", which is incorporated herein by reference, reveals how target range is derived from these signals. Following range processing, the complex (real and imaginary) echo time series for each range cell is Fourier transformed to obtain Doppler spectra and/or cross spectra among several receive antennas or elements. The velocity of the echoing target (current or vessel), as well as its bearing, is extracted from the signals at this point. One suitable and widely used bearing determination algorithm is Multiple Signal Classification (MUSIC), a direction-finding (DF) technique described in commonly assigned U.S. Pat. No. 5,990,834, filed Aug. 29, 1997, entitled "Radar angle determination with MUSIC direction finding", which is incorporated herein by reference. This backscatter radar makes its measurements in a polar coordinate system in which radial current velocity at each point in the coverage area is measured by each radar on the polar map.

Because a single radar measures a single radial vector component in polar coordinates, normally two backscatter radar systems are used in pairs, spaced tens of kilometers apart and operating independently. Based on the known geometry and location of a mutually observed scattering cell, two resulting radial velocity components are combined to produce a total velocity vector map across the overlapping coverage zone. Thus, one shortcoming of conventional systems is the need for multiple, costly backscatter radar systems for current mapping as well as robust vessel surveillance.

In networks of coastal radars, greater data coverage and robustness for a given number of backscatter radars can be obtained by synchronizing these systems to a stable timing base and operating them multi-statically. The methodology for this is discussed in commonly assigned U.S. Pat. No. 6,774,837, filed Oct. 27, 2003, entitled "Ocean surface current mapping with bistatic HF radar", which is incorporated herein by reference. The transmitter of one backscatter radar illuminates the sea surface, for example, where it is scattered by the waves or vessel target, and returns as echo to a different backscatter receiver. While thusly operating bistatically, each radar continues simultaneously receiving echoes in its normal backscatter mode. A convenient and inexpensive multi-static synchronization method in common use employs the stable time base of GPS satellite signals; this technique time-multiplexes the start times of each radar's FMCW modulation sweep in a controlled manner in order that their target echoes are distinctly and efficiently separated after demodulation so that they do not interfere with each other. This is discussed in commonly assigned U.S. Pat. No. 6,856,276, filed Mar. 28, 2002, entitled "Multi-station HF FMCW radar frequency sharing with GPS time modulation multiplexing," which is incorporated herein by reference.

There are peculiarities and asymmetries of bistatic radar pairs within this multi-static configuration. For one, echoes with constant time delay behind the transmitter-receiver signal do not fall on circles as they do in backscatter radars. They fall on ellipses with the transmitter and receiver as the focal points. The scalar data from this pair occur in an elliptical coordinate system rather than the polar coordinate system of backscatter radars. Moreover, using this multi-static configuration, bearing with oceanographic radars is still measured at the receiving antenna, which is configured to estimate the angle to the echo. The transmitter is omni-directional in its radiation, floodlighting the coverage area. This is a dissymmetry that favors the receiver end of the ellipse in terms of data quantity, quality, and robustness.

In a coastal network comprised of N backscatter radars with mutually overlapping target coverage, when operating multi-statically and measuring echo distance from conventional time delay, the target can be seen $$\frac{(N+1)\cdot N}{2}$$

times, based on the conventional practice described in the above-noted U.S. Pat. No. 6,774,837. This compares with just N if the radars operated in the conventional monostatic (backscatter) mode. In the limit of large N, prior conventional multi-static operation provides $N^2/2$ target measurements.

Accordingly, there is a need for improvement in expanding the number of measurements from the conventional multi-static operation discussed above, and removing the dissymmetry favoring the receiver end of the bistatic pair geometry.

SUMMARY

In one aspect, the invention features a multi-static radar system for monitoring water surface targets. The radar system comprises a first radar, a second radar, a state machine, and a signal processor. The first and second radars each include a transmitter and a receiver, and are located in separate locations and are synchronized using timing signals. Each radar is configured to transmit radar signals and receive echoes of radar signals from the other radar. The state machine is configured to determine, using the timing signals, start times and end times of radio frequency signal modulations for each radar, the start time of the radio frequency signal modulation of the second radar being offset from the start time of the radio frequency signal modulation of the first radar. The signal processor is configured to simultaneously receive and process the echoes of the radar signals received at the first and second radars to determine position and velocity vectors for the monitored water surface targets, wherein a first set of position and velocity vectors is determined from echoes, received at the first radar, of the radar signals transmitted by the second radar, and wherein a second set of position and velocity vectors is determined from echoes, received at the second radar, of radar signals transmitted by the first radar.

Various implementations of the invention may include one or more of the following features. The multi-static radar system may comprise N radars configured to operate multi-statically, wherein $T_{(n)}^{(n-1)}$ is a time delay for the start time of a radio frequency signal modulation for a radar n, wherein $T_{(n)}^{(n-1)}$ is defined to be:

$$T_{(n)}^{(n-1)} > Tp_{(n-1)}^{(n)} + t_{(n-1),e}$$

wherein $Tp_{(n-1)}^{(n)}$ is a time for a radar echo signal to propagate directly between a radar n−1 and the radar n, and $t_{(n-1),e}$ is a time delay of radar echoes of the radar n−1 beyond receipt of the directly propagated radar echo signal. In these implementations, the total time delay $t_d$ for radar echoes received at the radar n from the radar n−1 may be defined as:

$$t_d = Tp_{(n-1)}^{(n)} - T_{(n)}^{(n-1)} + t_{(n-1),e}$$

wherein an unwrap of a range fast Fourier transform (FFT) of the radar echoes received at the radar n results in radar echoes falling in a negative range of the range FFT when the total time delay $t_d$ for the radar echoes is negative.

The first and second radars of the multi-static radar system may be one of the following: an MF radar, an HF radar, a VHF radar, and a UHF radar. The timing signals may be provided by a Global Positioning System (GPS) or by one of: a rubidium-disciplined oscillator, an oven-controlled crystal oscillator, and a similar stable time base providing the same function.

In another aspect, the invention features a method of monitoring water surface targets using a multi-static radar system comprising at least two radars. Each of the at least two radars includes a transmitter and receiver, and the at least two radars are located in separate locations and synchronized using timing signals. The method comprises determining, using the timing signals, start times and end times of radio frequency signal modulations for each of the at least two radars. The method further comprises transmitting, according to the determined start and end times, radar signals from the transmitters of the at least two radars, the start time of a radio frequency signal modulation of a first radar being offset from the start time of a radio frequency signal modulation of a second radar. The method further comprises determining position and velocity vectors for a monitored water surface target by simultaneously receiving and processing the echoes of the radar signals received at the first and second radars, wherein a first set of position and velocity vectors is determined from echoes, received at the first radar, of the radar signals transmitted by the second radar, and wherein a second set of position and velocity vectors is determined from echoes, received at the second radar, of radar signals transmitted by the first radar.

Various implementations of the invention may include one or more of the following features. For the above-noted method, the multi-static radar system may comprise N radars configured to operate multi-statically, wherein $T_{(n)}^{(n-1)}$ is a time delay for the start time of a radio frequency signal modulation for a radar n, wherein $T_{(n)}^{(n-1)}$ is defined to be:

$$T_{(n)}^{(n-1)} > Tp_{(n-1)}^{(n)} + t_{(n-1),e}$$

wherein $Tp_{(n-1)}^{(n)}$ is a time for a radar echo signal to propagate directly between a radar n−1 and the radar n, and $t_{(n-1),e}$ is a time delay of radar echoes of the radar n−1 beyond receipt of the directly propagated radar echo signal. A total time delay $t_d$ for radar echoes received at the radar n from the radar n−1 may be defined as:

$$t_d = Tp_{(n-1)}^{(n)} - T_{(n)}^{(n-1)} + t_{(n-1),e}$$

wherein an unwrap of a range fast Fourier transform (FFT) of the radar echoes received at the radar n results in radar echoes falling in a negative range of the range FFT when the total time delay $t_d$ for the radar echoes is negative.

In implementations of the above-noted method, the at least two radars may be one of the following: an MF radar, an HF radar, a VHF radar, and a UHF radar. The timing signals may be provided by a Global Positioning System (GPS) or by one of: a rubidium-disciplined oscillator, an oven-controlled crystal oscillator, and a similar stable time base providing the same function.

In another aspect, the invention features a computer program product comprising a non-transitory computer readable storage medium on which is provided program instructions for monitoring water surface targets using a multi-static radar system comprising at least two radars, each of the at least two radars including a transmitter and receiver, located in separate locations, and synchronized using timing signals. The instructions comprise code for determining, using the timing signals, start times and end times of radio frequency signal modulations for each of the at least two radars. The instructions further comprise code for transmitting, according to the determined start and end times, radar signals from the transmitters of the at least two radars, the start time of a radio frequency signal modulation of a first radar being offset from the start time of a radio frequency signal modulation of a second radar. The instructions further comprise code for determining position and velocity vectors for the monitored water surface targets by simultaneously receiving and processing the echoes of the radar signals received at the first and second radars, wherein a first set of position and velocity vectors is determined from echoes, received at the first radar, of the radar signals transmitted by the second radar, and wherein a second set of position and velocity vectors is determined from echoes, received at the second radar, of radar signals transmitted by the first radar.

Various implementations of the computer program product may include one or more of the following features. The multi-static radar system may comprise N radars configured to operate multi-statically, wherein $T_{(n)}^{(n-1)}$ is a time delay for the start time of a radio frequency signal modulation for a radar n, wherein $T_{(n)}^{(n-1)}$ is defined to be:

$$T_{(n)}^{(n-1)} > Tp_{(n-1)}^{(n)} + t_{(n-1),e}$$

wherein $Tp_{(n-1)}^{(n)}$ is a time for a radar echo signal to propagate directly between a radar n−1 and the radar n, and $t_{(n-1),e}$ is a time delay of radar echoes of radar n−1 beyond receipt of the directly propagated radar echo signal. A total time delay $t_d$ for radar echoes received at the radar n from the radar n−1 may be defined as:

$$t_d = Tp_{(n-1)}^{(n)} - T_{(n)}^{(n-1)} + t_{(n-1),e}$$

wherein an unwrap of a range fast Fourier transform (FFT) of the radar echoes received at the radar n results in radar echoes falling in a negative range of the range FFT when the total time delay $t_d$ for the radar echoes is negative.

In implementations of the computer program product, the at least two radars may be one of the following: an MF radar, an HF radar, a VHF radar, and a UHF radar. The timing signals may be provided by a Global Positioning System (GPS) or by one of: a rubidium-disciplined oscillator, an oven-controlled crystal oscillator, and a similar stable time base providing the same function.

In another aspect, the invention features a multi-static radar system for monitoring water surface targets. The radar system comprises N bistatic radars, a state machine, and a signal processor. Each of the N bistatic radars includes a transmitter and a receiver, located in separate locations, and synchronized using timing signals. Each bistatic radar is configured to transmit radar signals and receive echoes of radar signals from the other bistatic radars. The state machine is configured to determine, using the timing signals, start times and end times of radio frequency signal modulations for each bistatic radar, the start time of the radio frequency signal modulation of a bistatic radar n being offset from the start time of the radio frequency signal modulation of a bistatic radar n−1. The signal processor is configured to simultaneously receive and process the echoes of the radar signals received at the N bistatic radars to determine velocity vectors for a monitored water surface target, wherein a first set of velocity vectors is determined from echoes, received at bistatic radar n, of the radar signals transmitted by bistatic radar n−1, and wherein a second set of velocity vectors is determined from echoes, received at bistatic radar n−1, of radar signals transmitted by bistatic radar n. The N bistatic radars are configured to operate multi-statically, wherein $T_{(n)}^{(n-1)}$ is a time delay for the start time of a radio frequency signal modulation for radar n, wherein $T_{(n)}^{(n-1)}$ is defined to be:

$$T_{(n)}^{(n-1)} > Tp_{(n-1)}^{(n)} + t_{(n-1),e}$$

wherein $Tp_{(n-1)}^{(n)}$ is a time for a radar echo signal to propagate directly between bistatic radar n−1 and bistatic radar n, and $t_{(n-1),e}$ is a time delay of radar echoes of radar n−1 beyond receipt of the directly propagated radar echo signal.

Various implementations of the invention may include one or more of the following features. A total time delay $t_d$ for radar echoes received at bistatic radar n from bistatic radar n−1 may be defined as:

$$t_d = Tp_{(n-1)}^{(n)} - T_{(n)}^{(n-1)} + t_{(n-1),e}$$

wherein an unwrap of a range fast Fourier transform (FFT) of the radar echoes received at bistatic radar n results in radar echoes falling in a negative range of the range FFT when the total time delay $t_d$ for the radar echoes is negative.

The invention can include one or more of the following advantages. For one, a bistatic pair of radars, according to the present invention, can have both radars of the pair serve as receivers, rather than just one. This eliminates the dissymmetry inherent in prior multi-static operations discussed earlier, and doubles the amount of bistatic information output through use of both radars' bistatic echoes instead of just one. Moreover, in many situations, the present invention may expand the coverage area of a bistatic pair of radars, allowing for more efficient use of the radars. Another advantage of the present invention is the increase in accuracy of echo parameters, including position and velocity, as a consequence of doubling the amount of information. Furthermore, the redundancy compensates for some types of hardware failure at one of the radar sites.

These and other features and advantages of the present invention will be presented in more detail in the following specification of the invention and the accompanying figures, which illustrate by way of example the principles of the invention.

BRIEF DESCRIPTION OF THE DRAWINGS

The invention may best be understood by reference to the following description taken in conjunction with the accompanying drawings that illustrate specific embodiments of the present invention.

DETAILED DESCRIPTION

Figure 1:
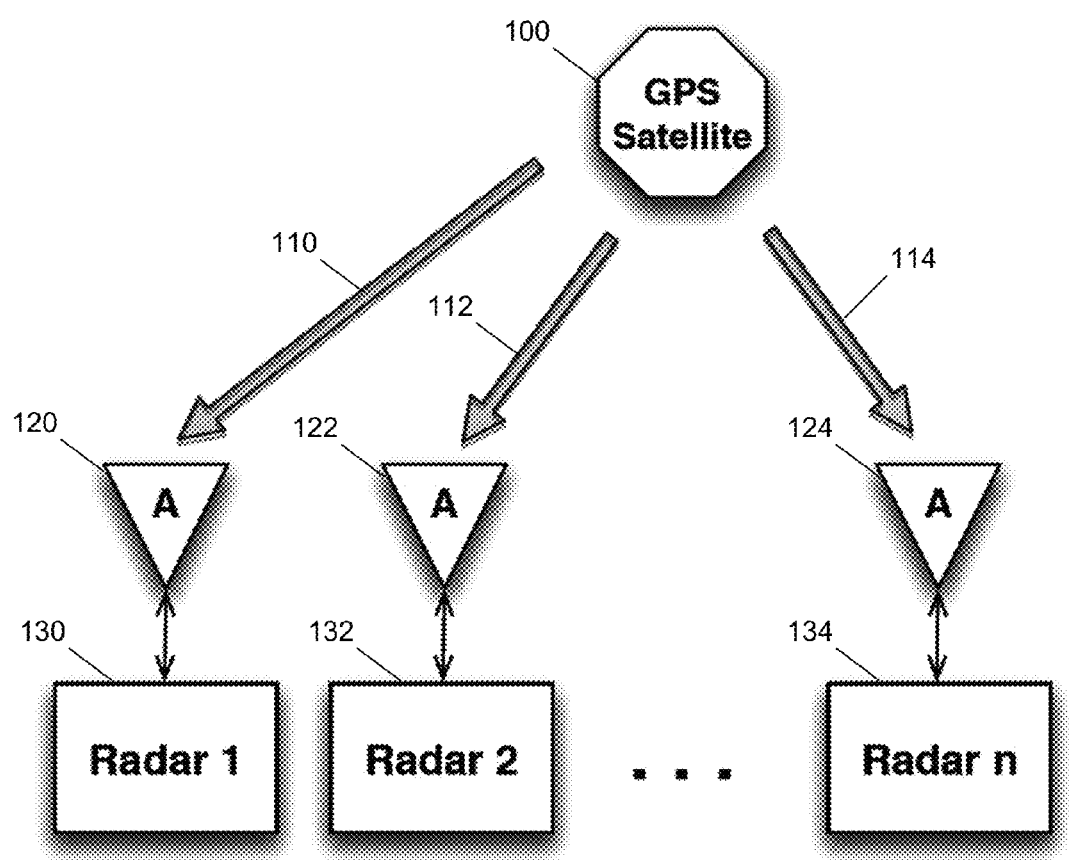
FIG. 1 is a block diagram showing GPS satellite timing signals being received by a number of radars that are to be used in multi-static operations among each other, according to one embodiment of the present invention.

Reference will now be made in detail to some specific embodiments of the present invention including the best modes contemplated by the inventor for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

The present invention is a novel extension of bistatic or multi-static FMCW radars that operate on or near bodies of water to map surface currents or detect ship targets. Multi-static radar operation means combinations of bistatic pairings of "n" radars. These are synchronized together so that their signals are coherent.

The present invention provides an augmentation improvement to conventional bistatic current mapping and ship detection. The present invention doubles the amount of information for a bistatic radar pair by allowing both systems at the focal points of the ellipses to be used for both transmit and receive, instead of only one. This is done by introducing the concept of "negative range" (or negative time delay to target), made possible by the FMCW (frequency-modulated continuous wave) signals that HF radars employ. This is achieved by signal processing following digitization in the radar receivers.

The present invention provides an algorithmic methodology and resulting computer program product that will allow capture of the bistatic echoes of a second unit of a pair of radars that was heretofore not known. This yields a second set of current vectors or ship detections independent from the first set, doubling the amount of information available from the bistatic pair.

A multi-static radar system is provided having a number of transmitters and receivers, for transmitting radar signals and receiving their echoes. In the most general configuration, at each physical radar location, a transmitter and receiver are included. The transmitters and receivers at one location have their signals generated at each site, but their local oscillators are locked or synchronized together among different sites, for example by the common global positioning system (GPS) timing base. However, the present invention embodies any method of timing that accomplishes the synchronization exemplified above by GPS. This provides coherency between all transmitters and receivers, as described in U.S. Pat. No. 6,856,276.

Departing from the prior art, the present invention reveals how the FMCW modulation start times can be configured so that—in addition to Radar 1 capturing the echoes from Radar 2's transmitter—Radar 2's receiver will capture the echoes from Radar 1's transmitter. This involves the concept of "negative range" or "negative time delay" that had been overlooked up to the present as a multi-static information source.

FIG. 1 is a block diagram showing GPS satellite timing signals 110, 112, 114 being received by a number "n" of radars 130, 132, 134 that are to be used in multi-static operations among each other, according to one embodiment of the present invention. This embodiment uses precisely timed signals 110, 112, 114 from the GPS (global positioning system) satellite 100 network to discipline the oscillators of the individual radars 130, 132, 134 so that their signals remain stably synchronized among each other, achieving a stability of approximately one part in $10^{12}$. This allows separation of multiple echo signals seen in one radar receiver that are simultaneously generated from transmissions by the transmitters of multiple radars. The timing signals 110, 112, 114 from the GPS satellites 100 are shown being received by the radar antennas (A) 120, 122, 124 in FIG. 1.

The radars 130, 132, 134 may be located along the coast, on islands, or on offshore platforms. The radars operate in a surface-wave mode, meaning that vertically polarized signals propagate as attached to the ocean or water surface and may achieve distances beyond the visible horizon to and from a target scatterer. They are positioned so that the same target point may be seen by more than one radar (in this case "n" radars), which enables multi-static operations. The radars 130, 132, 134 generally include both a transmitter and receiver. The radars use a direct digital synthesizer (DDS) or other stable digital waveform generation method to create the waveform that is transmitted and also used for demodulation of the echo signals produced by its own transmitter as well as the other transmitters in the multi-static mode of operation. These multiple echoes are received and processed simultaneously because all radars are operating all of the time.

Figure 2:
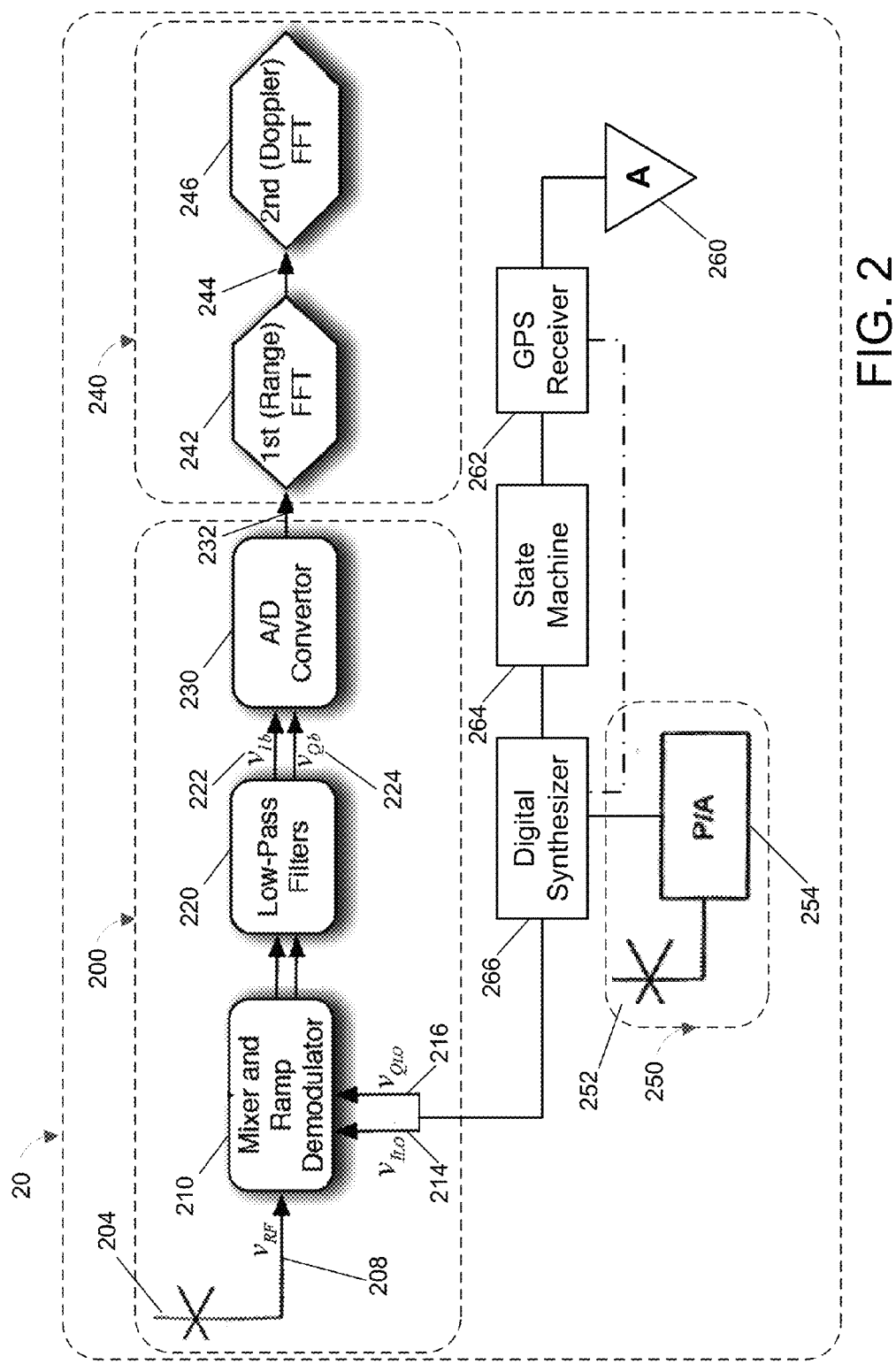
FIG. 2 is an exemplary block diagram of a bistatic radar including a transmitter module and a receiver module for transmitting and receiving radar signals.

FIG. 2 is an exemplary block diagram of a bistatic radar 20 including a transmitter module 250 and a receiver module 200 for transmitting and receiving radar signals. As illustrated, rectangular blocks 210, 220, 230 are hardware functions, while the pointed blocks 242, 246 represent digital computer processing functions.

The receiver 200 receives and decodes radar signals or echoes, providing demodulated, filtered, digitized signals 232 to a signal processor 240, which extracts information from the received echoes to generate velocity vectors from the received echoes. In FIG. 2, the signal processor 240 is located within the radar 20. However, in other implementations, the signal processor 240 may reside at a different location away from the radar 20 and the digitized signals 232 may be transmitted the signal processor at its remote location. The receiver may include a receive antenna 204, a mixer and ramp demodulator 210, one or more low-pass filters 220, and an analog-to-digital (A/D) convertor 230. The signal processor 240 may include a general purpose digital computer programmed according to the present invention to process information derived from radar echoes to determine and display information on oceanic conditions. Generally, the signal processor 240 encompasses several elements or stages in which information is processed, including a range fast Fourier transform 242 and a Doppler fast Fourier transform 246.

More specifically, input to the mixer 210 on the left is an RF signal 208 ($v_{RF}$) from the receive antenna 204 containing the echoes (both backscatter and multi-static), modulated by the linear frequency sweep characteristic of FMCW signals. This can be written by the equation:

$$v_{RF} = A(t)\cos\left[2\pi\left(f_o(t-t_d) - \frac{\Delta(t-t_d)^2}{2} + \varphi(t)\right)\right] \quad \text{(Eq. 1)}$$

where $t_d$ is the time delay of the echoes (including any purposeful sweep start time offset); $f_o$ is the center carrier frequency; $A(t)$, $\varphi(t)$ are amplitude and phase quantities representing slow-moving sea-echo or ship signals that are Doppler shifted by their motion; $\Delta$ is the linear FMCW sweep rate in Hz/second. The minus sign in front of $\Delta$ implies a downsweep, i.e., frequency starts high and ends low. This contrasts with an upsweep that starts low and ends high. This equation is valid over a single sweep period $T_s$, i.e., such that time t falls between $$-\frac{T_s}{2} \le t \le +\frac{T_s}{2}.$$

In a standard mixer 210 with I/Q (in-phase and quadrature) channels, local-oscillator (LO) signals 214 ($v_{I_{LO}}$), 216 ($v_{Q_{LO}}$) are depicted being input at the bottom. These signals are:

$$v_{I_{LO}} = \cos\left[2\pi\left(f_o t - \frac{\Delta t^2}{2}\right)\right] \text{ and} \quad \text{(Eq. 2)}$$

$$v_{Q_{LO}} = \sin\left[2\pi\left(f_o t - \frac{\Delta t^2}{2}\right)\right] \quad \text{(Eq. 3)}$$

The local-oscillator signals 214, 216 are provided by a local oscillator (not shown) of a digital synthesizer 266 that, in this implementation, is disciplined and synchronized by a GPS signal received at a GPS receiver 262 via a GPS antenna 260. In one implementation, signals from a visible constellation of GPS satellites impinge on the GPS antenna 260 and pass into the GPS receiver 262. The GPS receiver 262 is designed specifically to extract time information from the GPS signals, in contrast with the more common positional information of conventional GPS receivers. In order to provide accurate positional information, the individual satellites carry timing signals that are synchronized among each other to a precision and accuracy of a few nanoseconds. In one embodiment, these timing signals may be sent to earth at one second intervals. The timing signals are fed to a state machine 264 and, in some implementations, to the digital synthesizer 266 of the radar 20 via a phase-locked oscillator (not pictured) and a clock generator (also not pictured), as generally described in U.S. Pat. No. 6,856,276.

The state machine 264 may generate signals that turn on and off the transmitter output and receiver input signals, so that they are not on at the same time. It also turns on and off switches or gates that further suppress, transmit, or receive signals at various points in the system when they are not wanted. It may also determine the start and end times of the linear frequency sweep modulation for the radar 20. The sweep start times in different radars that are synchronized via the common GPS timing may be offset in order to separate the local sea-echo information from each radar so that they do not interfere with each other.

The digital synthesizer 266 may include a local oscillator (not shown) for generating a carrier frequency or wave and a signal for modulating the carrier wave to produce the radar signal transmitted by a transmitter 250 of the radar 20. The modulated radar signal may then be passed from the digital synthesizer 266 through a transmit-amplifier or power-amplifier (P/A) 254 and radiated from the transmit antenna 252. The transmit antenna may be configured to provide a broad beam, usually between 120 degrees and 360 degrees in bearing angle, illuminating a large area of ocean or water concerning which information on oceanic conditions is needed.

Returning to the mixer and ramp demodulator 210, the mixing process demodulates the echo signals by inclusion of the sweep on the LO signals, as shown above. Then these signals are low-pass filtered as represented by the second block function 220 of FIG. 2. This removes second (and higher) harmonics and out-of-band spurs, so that the inputs 222 ($v_{Ib}$), 224 ($v_{Qb}$) to the A/D convertor 230 are:

$$v_{Ib} = \frac{A(t)}{2}\cos[2\pi(\Delta t_d t + \varphi(t) - \varphi_c)] \text{ and} \quad \text{(Eq. 4)}$$

$$v_{Qb} = \frac{A(t)}{2}\sin[2\pi(\Delta t_d t + \varphi(t) - \varphi_c)] \quad \text{(Eq. 5)}$$

where $\phi_c$ is an irrelevant phase constant common to both signals.

The signal output 232 ($v_c$) from the A/D convertor 230, sampled at discrete times $t_i$ can be combined in complex form $v_c = v_{Ib} + iv_{Qb}$ to get:

$$v_c = \frac{A(t_i)}{2}\exp[2\pi i(\Delta t_d t_i + \varphi(t_i) - \varphi_c)] \quad \text{(Eq. 6)}$$

A quantity $f_r \equiv \Delta t_d$ in the above equation represents a frequency $f_r$ offset that is directly proportional to the echo's time delay $t_d$ multiplied by the linear sweep rate $\Delta$. This is characteristic of FMCW signal processing in HF, VHF, UHF radars, references to which have been cited above. Examples typical of radars considered here might have a carrier center frequency, $f_0$, that is 20 MHz; a sweep rate $\Delta$ that is 100 kHz/second; and a baseband frequency offset $f_r$ that lies between 0 and 400 Hz.

The first step in digital processing of FMCW waveforms is to Fourier transform the above digitized signal time series over the sweep repetition period $T_s$, through a fast-Fourier-transform (FFT) step, shown as the 1$^{st}$ (Range) FFT 242. These outputs will be accumulated at times 0, $T_s$, 2$T_s$, 3$T_s$, ... n$T_s$, .... Then a target with total time-delay offset $t_d$ will appear in one or two spectral cells in the output of the range FFT. From the assumption that the slowly varying complex echo signal remains constant within the sweep period over which each FFT is done, the signal in that n-th output spectral (range) bin ($v_{rn}$) 244, from inspection of the above equation, will be $$v_{rn} = \frac{A(nT_s)}{2}\exp[2\pi i(\varphi(nT_s) - \varphi_c)] \quad \text{(Eq. 7)}$$

As further background to explain the present invention, the outputs of this range FFT may be interpreted. After normal unwrap of the FFT so that the lowest frequency lies in the center, each spectral output is a range bin. The zero bin in the center of the output array corresponds to an echo delay $t_d = 0$.

Figure 3:
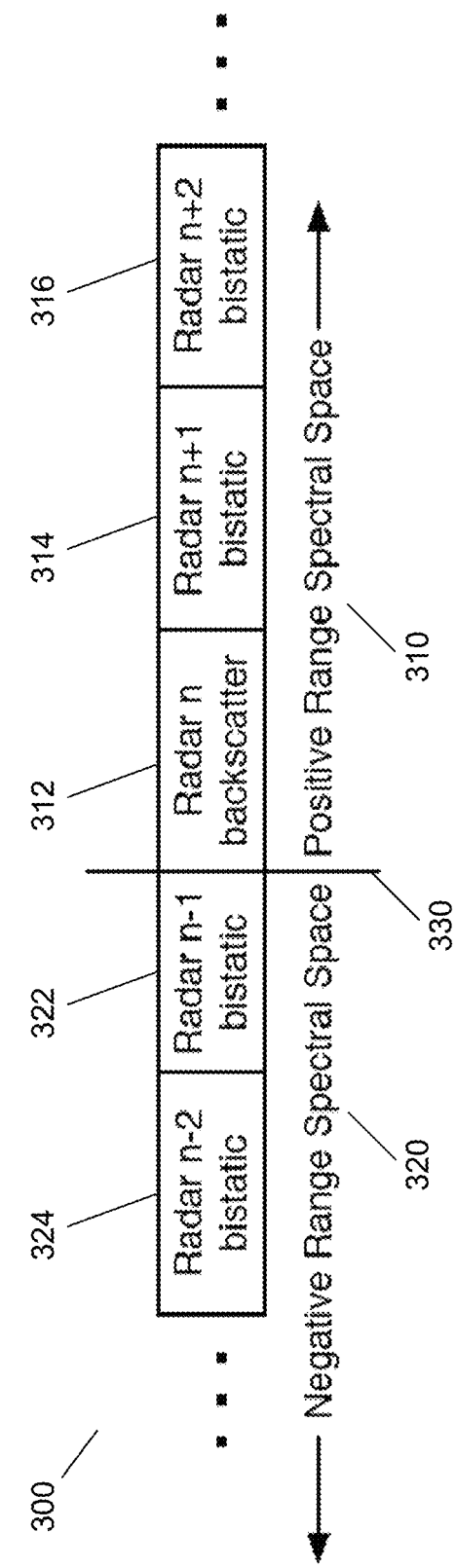
FIG. 3 is a diagrammatic representation of the range space occupied in multi-static radars, including both the positive ranges and the negative ranges.

FIG. 3 is a diagrammatic representation 300 of the range space occupied in multi-static radars, including both the positive ranges 310 and the negative ranges 320 (the present invention). Positive output range bins 312, 314, 316 to the right of this center position correspond to positive delays, which is the normal situation in a backscatter radar. In that case, range bins to the left of the center position 322, 324 would be filled with zeros, because only positive ranges are meaningful. In conventional prior practice, bistatic geometries with FMCW radars included and retained only positive range cells; the negative ones were not considered usable and were discarded.

After the 1$^{st}$ (Range) FFT processing step 242 of FIG. 2, the final processing is the 2$^{nd}$ (Doppler) FFT 246. This is used both for target velocity extraction and to maximize the echo signal-to-noise ratio.

If there are one or more bistatic transmitters whose echo sets are to be received and processed simultaneously, an offset is added to the beginning of the second transmitter's sweep start (the subject of U.S. Pat. No. 6,856,276). The total time delay ($t_d$) for an echo from the second transmitter's signal can be written:

$$t_d = Tp_{(2)}^{(1)} + T_{(2)}^{(1)} + t_{2e} \quad \text{(Eq. 8)}$$

where $Tp_{(2)}^{(1)}$ is the (positive) time delay for the signal transmitted from Radar 2 that propagates to Radar 1; $T_{(2)}^{(1)}$ is a purposeful (positive) time delay set for the start of Radar 2's sweep; and $t_{2e}$ is the added delay of any echoes based on Radar 2's transmit signal and echo reception at Radar 1's receiver. The sweep-start time $T_{(2)}^{(1)}$ is chosen to keep the bistatic echoes caused by Radar 2's transmitter from falling within the range-bin offset space from Radar 1's own backscatter echoes (i.e., so they do not mutually interfere).

By extension from bistatic to multi-static configurations, the same logic for time delay, $t_d$, above will allow Radar 3's sweep offset and echoes to be spaced consecutively further out in time delay (or bins outputted from the range FFT).

Referring back to FIG. 3, after the range FFT, echo time-delay space is related to its FFT output frequency spectrum by $f_r = \Delta t_d$. The vertical line 330 demarks the zero range position for backscatter from Radar n, with its echoes falling at cells 312 to the right, out to a range where echoes are no longer visible. At this point, the echoes from Radar n+1 begin in the next region 314 to the right, due to the programmed time delay for the start of its FMCW sweep modulation, which is represented as $T_{(n+1)}^{(n)}$, generalizing the time delay $T_{(2)}^{(1)}$ from the Radar 1 to be centered on Radar n. It is now understood that Radar n is the receiver, so that:

$$t_d = Tp_{(n+1)}^{(n)} + T_{(n+1)}^{(n)} + t_{(n+1),e} \quad \text{(Eq. 9)}$$

All time delays, $t_d$, up to now are positive, and so each consecutive bistatic radar's echo contributions are spaced further to the right, as shown in FIG. 3.

The numbering of the radars to be operated multi-statically proceeds in consecutive order from Radar 1 through Radar n up to Radar N. The time-delay offsets programmed for the sweep starts, $T_{(n+1)}^{(n)}$, also follow this consecutive ordering, designed to keep each radar's echoes separate from others in the sequence. Prior practice had been to ignore the negative spectral space 320 to the left of the vertical line 330 in FIG. 3 and these were never retained by the computer programs that produced output multi-static data. It was assumed they had no physical meaning Hence, N radars operating multi-statically could at most produce $$\frac{(N+1) \cdot N}{2}$$

echo sets, meaning N backscatter sets among the N radars plus $$\frac{(N-1) \cdot N}{2}$$

sets from the bistatically paired combinations.

The present invention employs the "negative-range" spectral space 320 from the range FFT 300 that had previously been discarded. Additionally revealed is how to configure the time offsets for the sweep starts of all radars, so as to not overlap any echo spectral space with others, thereby avoiding mutual interference.

An examination of Equation 9 for $t_d$ is relevant for determining positive FMCW frequency-start shifts. These are shown to the right in FIG. 3 of the vertical zero-range line 330. All three terms of this equation for delays are positive: the delay offset of the sweep-shift start, $T_{(n+1)}^{(n)}$; the time delay for the signal to propagate between displaced sites, $Tp_{(n+1)}^{(n)}$; and the delay of the echoes of Radar n+1 beyond receipt of the directly propagated signal, $t_{(n+1),e}$. Of these three terms, two by their physical nature are always positive: $Tp_{(n+1)}^{(n)}$ and $t_{(n+1),e}$. However, the shift in sweep start, $T_{(n+1)}^{(n)}$, can be either positive or negative.

Again, the radars from 1 through n to N have consecutively increasing, positive frequency-start shifts. Then, while the Radar n+1 signal will be shifted to the right in range-spectral space with respect to its observation at Radar n, the opposite is true for Radar n's signal being observed by Radar n+1; the "delay" becomes an "advance", or negative delay. The same is true for the Radar n−1 signal and echoes being observed at Radar n. Since we have focused on Radar n's receiver as the reference for exemplifying discussions, the equation for delay $t_d$ in this case becomes:

$$t_d = Tp_{(n+1)}^{(n)} + T_{(n+1)}^{(n)} + t_{(n-1),e} \quad \text{(Eq. 10)}$$

The inventive discovery comes in recognizing that $T_{(n+1)}^{(n)} \equiv T_{(n)}^{(n-1)}$. This simply means that if the sequence of positive start shifts is set such that ones to the left (superscript) with respect to those to the right (subscript) are positive, then viewed the other way, the shifts of those to the left with respect to those to the right become their negatives: a delay becomes an advance or vice versa by changing the sign in the equation. Thus the relevant time-delay equation is rewritten:

$$t_d = Tp_{(n-1)}^{(n)} - T_{(n)}^{(n-1)} + t_{(n-1),e} \quad \text{(Eq. 11)}$$

In this case, if $T_{(n)}^{(n-1)} > Tp_{(n+1)}^{(n)} + t_{(n-1),e}$, then $t_d$ becomes negative, and after the range FFT 242 of FIG. 2, its echoes lie to the left of the zero vertical line 330 of FIG. 3. The bistatic signals from Radar n−1 322 had been ignored up to now in the prior art for Radar n as having no meaning because the concept of "negative range" did not appear to make physical sense. Now these can actually become useful data, doubling the possible outputs from multi-static operations. These newly discovered range cells with radar echo data, and their extraction, may be referred to as "negative pseudo-range processing".

An important feature is revealed in implementing this "negative pseudo-range processing". That is the feature of having negative time delay $t_d$, which demands that:

$$T_{(n)}^{(n-1)} > Tp_{(n-1)}^{(n)} + t_{(n-1),e}, \quad \text{(Eq. 12)}$$

This means the sweep-start delays are to be chosen and set into the waveform generator and processor such that Equation 12 is valid. Said another way, if $T_{(n)}^{(n-1)}$ is too small so that the Equation 12 is not met, then bistatic echoes from Radar n−1 will overlap the backscatter echoes from Radar n, contaminating them thusly with ambiguous mutual interference. The most efficient and concise sequencing of sweep-start times so that echo regions do not overlap will result in the range spectral space 322 for the bistatic set immediately to the left of the zero-range vertical line 330 of FIG. 3 being smaller that all of the other multi-static echo spaces. This reality is shown in the plot in FIG. 3.

The present invention thus makes it possible to obtain $N^2$ measurements when operating N radars multi-statically. To give an example, if there are four radars with overlapping backscatter and multi-static coverage, then N=4. Prior to the present invention, a total of 10 observations would be seen with no additional hardware. Employing the present methods, 16 observations are now possible. This is a significant feature and improvement over prior art.

Figure 4A:
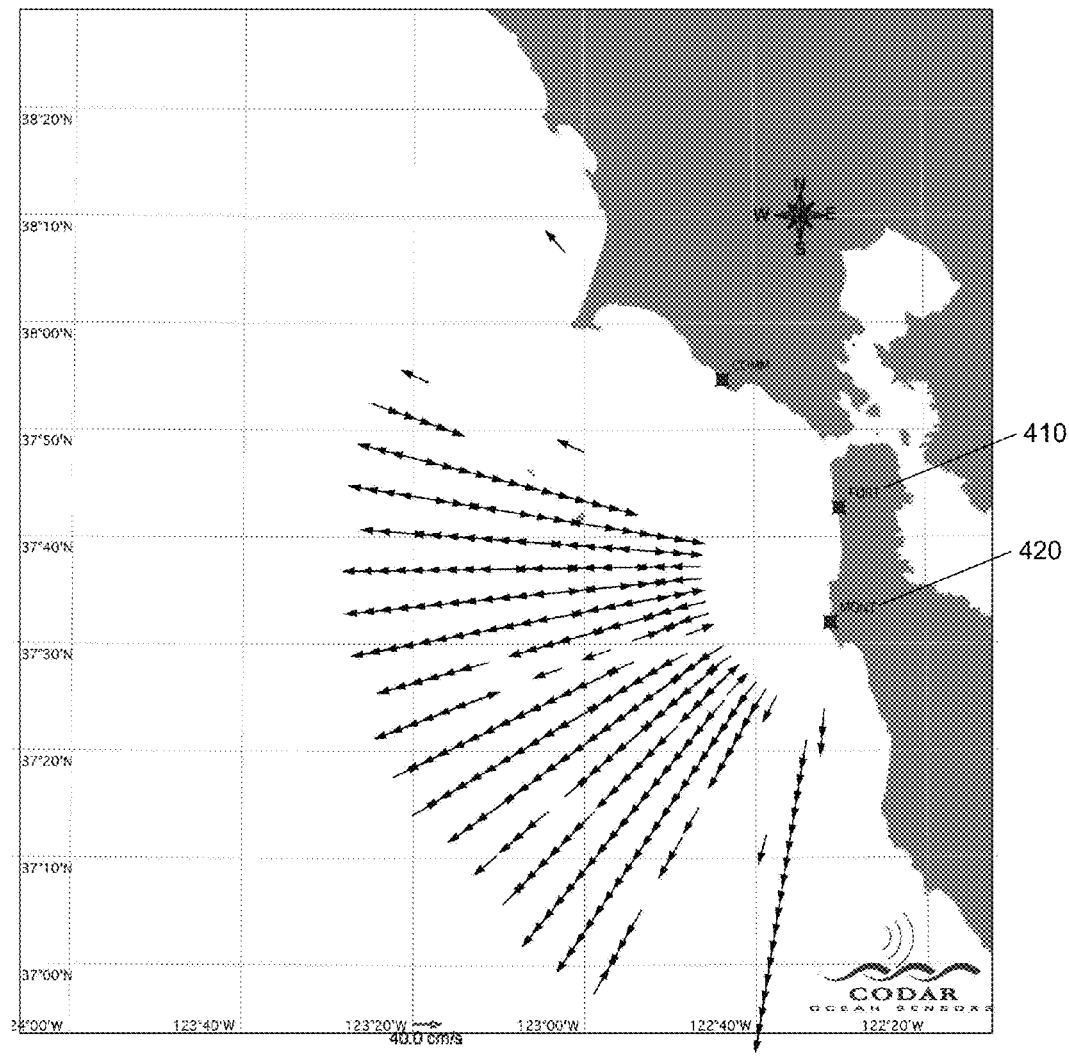
FIG. 4A is an example of an output bistatic ocean surface current map created by a pair of radars operating in positive range mode according to the prior art.
Figure 4B:
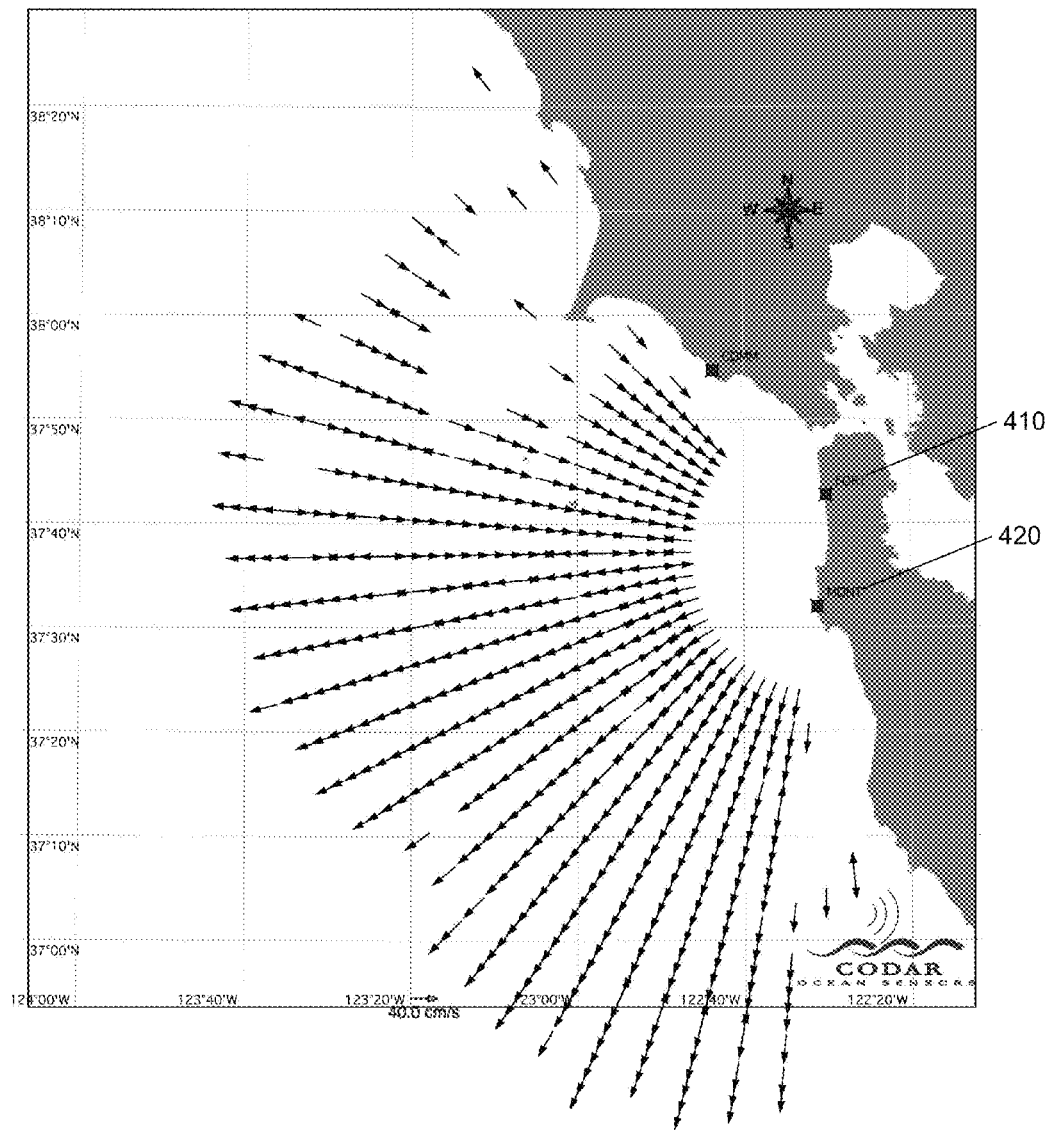
FIG. 4B is an example of an output bistatic ocean surface current map created by a pair of radars operating in the negative range mode that results from an embodiment of the present invention.

FIG. 4A is an example of an output bistatic ocean surface current map created by a pair of radars operating in positive range according to the prior art. FIG. 4B is an example of an output bistatic ocean surface current map created by a pair of radars operating in the negative range mode that results from an embodiment of the present invention.

FIGS. 4A and 4B show two examples of bistatic currents mapped by a network of 13.4 MHz HF radars on the California West coast, just South of the Golden Gate entry to the San Francisco Bay. The bistatic radar pair in this case has radars located at Fort Funston and Montara (designated FORT 410 and MONT 420, respectively). These radars are operating at the same time, and are viewing the same ocean conditions. In the FIG. 4A, FORT 410 is the transmit source for the echoes received at MONT 420 that produced the mapped currents. This is a typical result for bistatic surface currents. Under the art prior to this invention, this would be the only map possible based on previous, positive-only time delays and resulting elliptical range cells.

Based on the techniques of the present invention, the map of FIG. 4B is the result of employing the echoes produced by the transmitter at MONT 420 and receiving the echoes at FORT 410. As mentioned earlier, advantages are: (i) incorporating two asymmetrical echo mappings (results are more accurate near the receiver end where bearing angle is determined); (ii) having redundant data fills in gaps, as seen; and (iii) averaging the two reduces the inherent noisiness of the data.

This is one embodiment and application as illustrated in FIGS. 4A and 4B. Included but not shown is use for hard target detection, e.g., ships. Two bistatic detections of the same ship target are now possible with a single bistatic transmit/receive pair. This improves probability of vessel detection, reduces false alarm rate, and increases the accuracy of position and velocity measurements of the ship.

The foregoing description of the preferred embodiments of the invention has been presented for the purposes of illustration and description. It is not intended to be exhaustive or to limit the invention to the precise form disclosed, and obviously many modifications and variations are possible in light of the above teaching. The embodiments were chosen and described in order to best explain the principles of the invention and its practical application to thereby enable others skilled in the art to best utilize the invention in various embodiments and with various modifications as are suited to the particular use contemplated. For example, GPS timing was shown as a source of oscillator disciplining and synchronization for multi-static use, but many other stable timing sources are available such as rubidium-disciplined oscillators, oven-controlled crystal oscillators, etc. These are some of several alternative embodiments of the present invention. Thus it is intended that the scope of the invention be defined by the claims appended hereto and are not limited to the precise embodiments described herein.

Although certain of the components and processes are described above in the singular for convenience, it will be appreciated by one of skill in the art that multiple components and repeated processes can also be used to practice the techniques of the present invention.

While the invention has been particularly shown and described with reference to specific embodiments thereof, it will be understood by those skilled in the art that changes in the form and details of the disclosed embodiments may be made without departing from the spirit or scope of the invention. For example, the embodiments described above may be implemented using a variety of materials. Therefore, the scope of the invention should be determined with reference to the appended claims.

What is claimed is:

1. A multi-static radar system for monitoring water surface targets, comprising:
    (a) a first radar including a first transmitter and a first receiver;
    (b) a second radar including a second transmitter and a second receiver, the first and second radars located in separate locations and synchronized using timing signals, each radar configured to transmit radar signals and receive echoes of radar signals from the other radar;
    (c) a state machine configured to determine, using the timing signals, start times and end times of radio frequency signal modulations for each radar, the start time of the radio frequency signal modulation of the second radar being offset from the start time of the radio frequency signal modulation of the first radar; and
    (d) a signal processor configured to simultaneously receive and process the echoes of the radar signals received at the first and second radars to determine position and velocity vectors for the monitored water surface targets, wherein a first set of position and velocity vectors is determined from echoes, received at the first radar, of the radar signals transmitted by the second radar, and wherein a second set of position and velocity vectors is determined from echoes, received at the second radar, of radar signals transmitted by the first radar.

2. The multi-static radar system of claim 1, comprising N radars configured to operate multi-statically, wherein $T_{(n)}^{(n-1)}$ is a time delay for the start time of a radio frequency signal modulation for a radar n, wherein $T_{(n)}^{(n-1)}$ is defined to be:

$$T_{(n)}^{(n-1)} > Tp_{(n-1)}^{(n)} + t_{(n-1),e}$$

wherein $T_{(n-1)}^{(n)}$ is a time for a radar echo signal to propagate directly between a radar n−1 and the radar n, and $t_{(n-1),e}$ is a time delay of radar echoes of the radar n−1 beyond receipt of the directly propagated radar echo signal.

3. The multi-static radar system of claim 2, wherein a total time delay $t_d$ for radar echoes received at the radar n from the radar n−1 is defined as:

$$t_d = Tp_{(n-1)}^{(n)} - T_{(n)}^{(n-1)} + t_{(n-1),e}$$

wherein an unwrap of a range fast Fourier transform (FFT) of the radar echoes received at the radar n results in radar echoes falling in a negative range of the range FFT when the total time delay $t_d$ for the radar echoes is negative.

4. The multi-static radar system of claim 1, wherein the first and second radars are one of the following: an MF radar, an HF radar, a VHF radar, and a UHF radar.

5. The multi-static radar system of claim 1, wherein the timing signals are provided by a Global Positioning System (GPS).

6. The multi-static radar system of claim 1, wherein the timing signals are provided by one of: a rubidium-disciplined oscillator, an oven-controlled crystal oscillator, and a similar stable time base providing the same function.

7. A method of monitoring water surface targets using a multi-static radar system comprising at least two radars, each of the at least two radars including a transmitter and receiver, located in separate locations and synchronized using timing signals, the method comprising:
    determining, using the timing signals, start times and end times of radio frequency signal modulations for each of the at least two radars;
    transmitting, according to the determined start and end times, radar signals from the transmitters of the at least two radars, the start time of a radio frequency signal modulation of a first radar being offset from the start time of a radio frequency signal modulation of a second radar; and
    determining position and velocity vectors for a monitored water surface target by simultaneously receiving and processing the echoes of the radar signals received at the first and second radars, wherein a first set of position and velocity vectors is determined from echoes, received at the first radar, of the radar signals transmitted by the second radar, and wherein a second set of position and velocity vectors is determined from echoes, received at the second radar, of radar signals transmitted by the first radar.

8. The method of claim 7, wherein the multi-static radar system comprises N radars configured to operate multi-statically, wherein $T_{(n)}^{(n-1)}$ is a time delay for the start time of a radio frequency signal modulation for a radar n, wherein $T_{(n)}^{(n-1)}$ is defined to be:

$$T_{(n)}^{(n-1)} > Tp_{(n-1)}^{(n)} + t_{(n-1),e}$$

wherein $Tp_{(n-1)}^{(n)}$ is a time for a radar echo signal to propagate directly between a radar n−1 and the radar n, and $t_{(n-1),e}$ is a time delay of radar echoes of the radar n−1 beyond receipt of the directly propagated radar echo signal.

9. The method of claim 8, wherein a total time delay $t_d$ for radar echoes received at the radar n from the radar n−1 is defined as:

$$t_d = Tp_{(n-1)}^{(n)} - T_{(n)}^{(n-1)} t_{(n-1),e}$$

wherein an unwrap of a range fast Fourier transform (FFT) of the radar echoes received at the radar n results in radar echoes falling in a negative range of the range FFT when the total time delay $t_d$ for the radar echoes is negative.

10. The method of claim 7, wherein the at least two radars are one of the following: an MF radar, an HF radar, a VHF radar, and a UHF radar.

11. The method of claim 7, wherein the timing signals are provided by a Global Positioning System (GPS).

12. The method of claim 7, wherein the timing signals are provided by one of: a rubidium-disciplined oscillator, an oven-controlled crystal oscillator, and a similar stable time base providing the same function.

13. A computer program product comprising a non-transitory computer readable storage medium on which is provided program instructions for monitoring water surface targets using a multi-static radar system comprising at least two radars, each of the at least two radars including a transmitter and receiver, located in separate locations, and synchronized using timing signals, the instructions comprising:
 code for determining, using the timing signals, start times and end times of radio frequency signal modulations for each of the at least two radars;
 code for transmitting, according to the determined start and end times, radar signals from the transmitters of the at least two radars, the start time of a radio frequency signal modulation of a first radar being offset from the start time of a radio frequency signal modulation of a second radar; and
 code for determining position and velocity vectors for the monitored water surface targets by simultaneously receiving and processing the echoes of the radar signals received at the first and second radars, wherein a first set of position and velocity vectors is determined from echoes, received at the first radar, of the radar signals transmitted by the second radar, and wherein a second set of position and velocity vectors is determined from echoes, received at the second radar, of radar signals transmitted by the first radar.

14. The computer program product according to claim 13, wherein the multi-static radar system comprises N radars configured to operate multi-statically, wherein $T_{(n)}^{(n-1)}$ is a time delay for the start time of a radio frequency signal modulation for a radar n, wherein $T_{(n)}^{(n-1)}$ is defined to be:

$$T_{(n)}^{(n-1)} > Tp_{(n-1)}^{(n)} + t_{(n-1),e}$$

wherein $Tp_{(n-1)}^{(n)}$ is a time for a radar echo signal to propagate directly between a radar n−1 and the radar n, and $t_{(n-1),e}$ is a time delay of radar echoes of radar n−1 beyond receipt of the directly propagated radar echo signal.

15. The computer program product according to claim 14, wherein a total time delay $t_d$ for radar echoes received at the radar n from the radar n−1 is defined as:

$$t_d = Tp_{(n-1)}^{(n)} - T_{(n)}^{(n-1)} t_{(n-1),e}$$

wherein an unwrap of a range fast Fourier transform (FFT) of the radar echoes received at the radar n results in radar echoes falling in a negative range of the range FFT when the total time delay $t_d$ for the radar echoes is negative.

16. The computer program product according to claim 13, wherein the at least two radars are one of the following: an MF radar, an HF radar, a VHF radar, and a UHF radar.

17. The computer program product according to claim 13, wherein the timing signals are provided by a Global Positioning System (GPS).

18. The computer program product according to claim 13, wherein the timing signals are provided by one of: a rubidium-disciplined oscillator, an oven-controlled crystal oscillator, and a similar stable time base providing the same function.

19. A multi-static radar system for monitoring water surface targets, comprising:
 N bistatic radars, each bistatic radar including a transmitter and a receiver, located in separate locations, and synchronized using timing signals, each bistatic radar configured to transmit radar signals and receive echoes of radar signals from the other bistatic radars;
 a state machine configured to determine, using the timing signals, start times and end times of radio frequency signal modulations for each bistatic radar, the start time of the radio frequency signal modulation of a bistatic radar n being offset from the start time of the radio frequency signal modulation of a bistatic radar n−1; and
 a signal processor configured to simultaneously receive and process the echoes of the radar signals received at the N bistatic radars to determine velocity vectors for a monitored water surface target, wherein a first set of velocity vectors is determined from echoes, received at bistatic radar n, of the radar signals transmitted by bistatic radar n−1, and wherein a second set of velocity vectors is determined from echoes, received at bistatic radar n−1, of radar signals transmitted by bistatic radar n;
 wherein the N bistatic radars are configured to operate multi-statically, wherein $T_{(n)}^{(n-1)}$ is a time delay for the start time of a radio frequency signal modulation for radar n, wherein $T_{(n)}^{(n-1)}$ is defined to be:

$$T_{(n)}^{(n-1)} > Tp_{(n-1)}^{(n)} + t_{(n-1),e}$$

wherein $Tp_{(n-1)}^{(n)}$ is a time for a radar echo signal to propagate directly between bistatic radar n−1 and bistatic radar n, and $t_{(n-1),e}$ is a time delay of radar echoes of radar n−1 beyond receipt of the directly propagated radar echo signal.

20. The multi-static radar system of claim 19, wherein a total time delay $t_d$ for radar echoes received at bistatic radar n from bistatic radar n−1 is defined as:

$$t_d = Tp_{(n-1)}^{(n)} - T_{(n)}^{(n-1)} t_{(n-1),e}$$

wherein an unwrap of a range fast Fourier transform (FFT) of the radar echoes received at bistatic radar n results in radar echoes falling in a negative range of the range FFT when the total time delay $t_d$ for the radar echoes is negative.

* * * * *